(12) United States Patent
Anderson

(10) Patent No.: US 7,988,349 B2
(45) Date of Patent: Aug. 2, 2011

(54) DEVICE AND METHOD FOR DISPLAYING OBJECTS

(76) Inventor: James K. Anderson, Minneapolis, MN (US)

(*) Notice: Subject to any disclaimer, the term of this patent is extended or adjusted under 35 U.S.C. 154(b) by 682 days.

(21) Appl. No.: 11/915,526

(22) PCT Filed: May 25, 2006

(86) PCT No.: PCT/US2006/020400
§ 371 (c)(1),
(2), (4) Date: Apr. 17, 2008

(87) PCT Pub. No.: WO2006/127984
PCT Pub. Date: Nov. 30, 2006

(65) Prior Publication Data
US 2009/0016175 A1   Jan. 15, 2009

Related U.S. Application Data

(60) Provisional application No. 60/684,736, filed on May 26, 2005.

(51) Int. Cl.
G04B 37/12 (2006.01)
A44C 5/00 (2006.01)
(52) U.S. Cl. ......... 368/278; 368/281; 368/309; 368/311
(58) Field of Classification Search ............... 368/10, 368/88, 278, 281, 286, 297–300, 309–313
See application file for complete search history.

(56) References Cited

U.S. PATENT DOCUMENTS

| | | | | |
|---|---|---|---|---|
| 2,845,773 A * | 8/1958 | Sakalys | ......... | 368/286 |
| 2,858,663 A * | 11/1958 | Schwarz | ......... | 368/286 |
| 4,132,062 A * | 1/1979 | Fujimori | ......... | 368/309 |
| 4,167,850 A * | 9/1979 | Schneider | ......... | 368/282 |
| 4,525,077 A * | 6/1985 | Ketner | ......... | 368/77 |
| 4,627,738 A * | 12/1986 | Kao | ......... | 368/281 |
| 6,186,552 B1 | 2/2001 | Seabrook | | |
| 6,464,390 B1 | 10/2002 | Baroche | | |
| 6,525,999 B1 | 2/2003 | Shevins | | |
| 6,618,328 B1 | 9/2003 | Ellner et al. | | |
| 6,724,691 B1 | 4/2004 | Kaminsky | | |
| 2002/0021624 A1* | 2/2002 | Hiranuma et al. | ......... | 368/282 |
| 2005/0243654 A1* | 11/2005 | Dufour et al. | ......... | 368/88 |

* cited by examiner

Primary Examiner — Vit W Miska
(74) Attorney, Agent, or Firm — Haugen Law Firm PLLP

(57) ABSTRACT

A device for displaying an item, wherein the item being displayed can be selectively changed. The device includes an annular body with an inside circumferential surface having an associated mounting arrangement including a shoulder, a groove and a snap ring. A changeable item for display is generally received in the annular body and held in place between the shoulder and the groove by positioning the snap ring into the groove. In some embodiments, the annular body may be adapted to be carried and used on a strap or band, generally in the manner a wristwatch is carried and used. In other embodiments, the annular body may be free-standing or adapted to be supported by a suitable support. The present invention may further include a cover hingedly attached to the annular body. In some embodiments, the cover may have generally similar characteristics as the annular body, it may interchangeably display other selected items, and/or it may include or display a watch face.

6 Claims, 17 Drawing Sheets

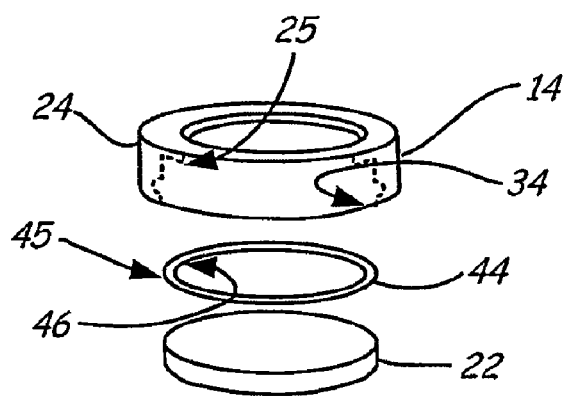 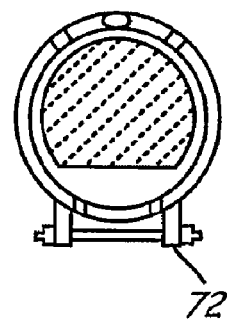
*FIG. 4A*  *FIG. 4B*
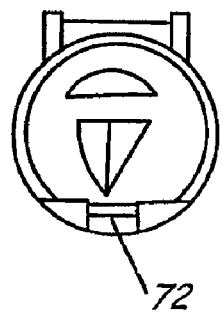 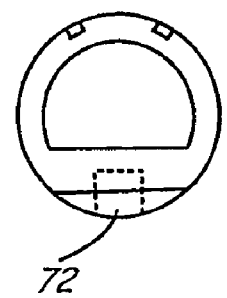
*FIG. 4C*  *FIG. 4D*
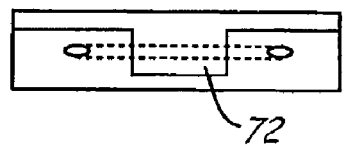 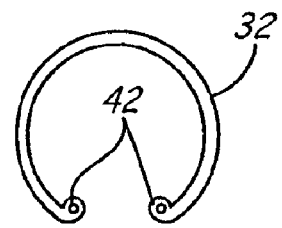
*FIG. 4E*  *FIG. 4F*

FIG. 14
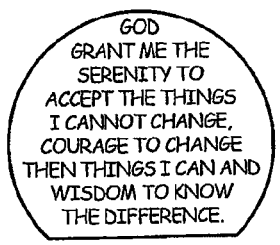
FIG. 14A
FIG. 14B
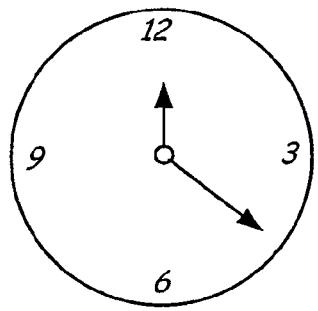
FIG. 14D
FIG. 14E
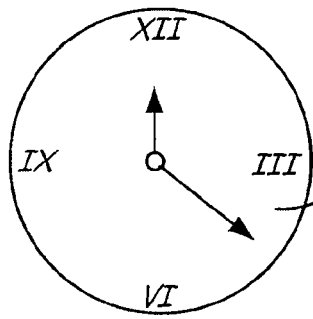
FIG. 14F

DEVICE AND METHOD FOR DISPLAYING OBJECTS

CROSS-REFERENCE TO RELATED APPLICATION

This Application is a Section 371 National Stage Application of International Application No. PCT/US2006/020400, filed 25 May 2006 and published as WO 2006/127984 A3 on 30 Nov. 2006, which claims the priority from the US application 60/684,736, filed 26 May 2005, the subject matter of which are hereby incorporated by reference in its entirety.

BACKGROUND

The present invention relates to devices and methods for displaying or mounting items, such as jewelry and similar objects, including wristbands for displaying ornaments. More particularly, it relates to devices, including wristbands or straps, and methods for displaying commemorative medallions.

Devices for displaying or mounting items for display are known in the prior art. Many such devices are adapted for containing and displaying specific items.

U.S. Pat. No. 6,525,999 (Shevins) discloses a wristwatch with an illuminated ornamental display separate from the clock face display, wherein the ornamental display is made of a translucent material and the light illuminates the ornamental display from beneath. The Shevins device has the primary purpose of enhancing the readability and ornamental appearance of a watch. Such a device is useful if the user has a translucent item to be displayed and does not mind the additional size of the wristwatch due to the separate displays for the clock face and the displayed item.

Another device disclosed in U.S. Pat. No. 6,724,691 (Kaminsky) displays artwork, logos, designs, etc. on an opaque area that lies above the hands of the clock, wherein the central portion of the clock hands are obscured by the opaque area. The Kaminsky device lacks the ability to selectively change the displayed artwork. It further bears limitations on the size of a design that may be incorporated underneath the crystal display of the watch face.

U.S. Pat. No. 6,186,552 (Seabrook) discloses a changeable memorandum wristband. The Seabrook device includes a cover that is closeable over the memorandum information. The device has the specific purpose of reminding the user of appointments, phone numbers and other similar information.

Accordingly, there is a need for a device for displaying items or objects either in conjunction with a wristband or a timepiece face or alone, wherein the items for display may be selectively and easily changed by the user.

SUMMARY

In one embodiment, the present invention comprises a device for displaying an item, wherein the item being displayed can be selectively changed. The device includes an annular body with an inside circumferential surface having an associated mounting arrangement including a shoulder, a groove, and a snap ring. A changeable item for display is generally received in the annular body and held in place between the shoulder and the groove by positioning the snap ring into the groove.

In another embodiment, the device for displaying an item includes an annular body with an inside circumferential surface having an associated mounting arrangement including a shoulder, a groove, and a cap. The inside circumferential surface of the annular body and the cap have complimentary threads. A changeable item for display is generally received in the annular body and held in place between the shoulder and the groove by screwing the cap into the annular body or by screwing the annular body into the cap.

In some embodiments, the annular body may be adapted to be carried and used on a strap or band, generally in the manner a wristwatch is carried and used. In other embodiments, the annular body may be free-standing or adapted to be supported by a suitable support. The present invention may further include a cover hingedly attached to the annular body. In some embodiments, the cover may have generally similar characteristics as the annular body, it may interchangeably display other selected items, and/or it may include or display a timepiece and/or the face of a timepiece.

The present invention, in another embodiment, may further include a cover hingedly attached to the annular body and having generally similar characteristics as the annular body. The cover may display additional items that may be selectively interchanged. The cover may also display a clock or watch face as a substitute for an additional item.

While multiple embodiments of the present invention are disclosed, including preferred embodiments, still other embodiments will become apparent to those skilled in the art from the description herein and the accompanying drawings, which show and describe illustrative embodiments of the invention. As will be realized, the invention is capable of modifications in various aspects, all without departing from its spirit and scope. Accordingly, the drawings and description are to be regarded as illustrative in nature and not restrictive.

BRIEF DESCRIPTION OF THE DRAWINGS

FIG. 4, including FIGS. 4A-F, depicts a diagram of a hinge, snap ring and cushioning ring of the present invention.

FIG. 5, including

FIG. 14, including FIGS. 14A-F, depicts a top view diagram of the face of an annular body or cover.

DETAILED DESCRIPTION

Figure 1:
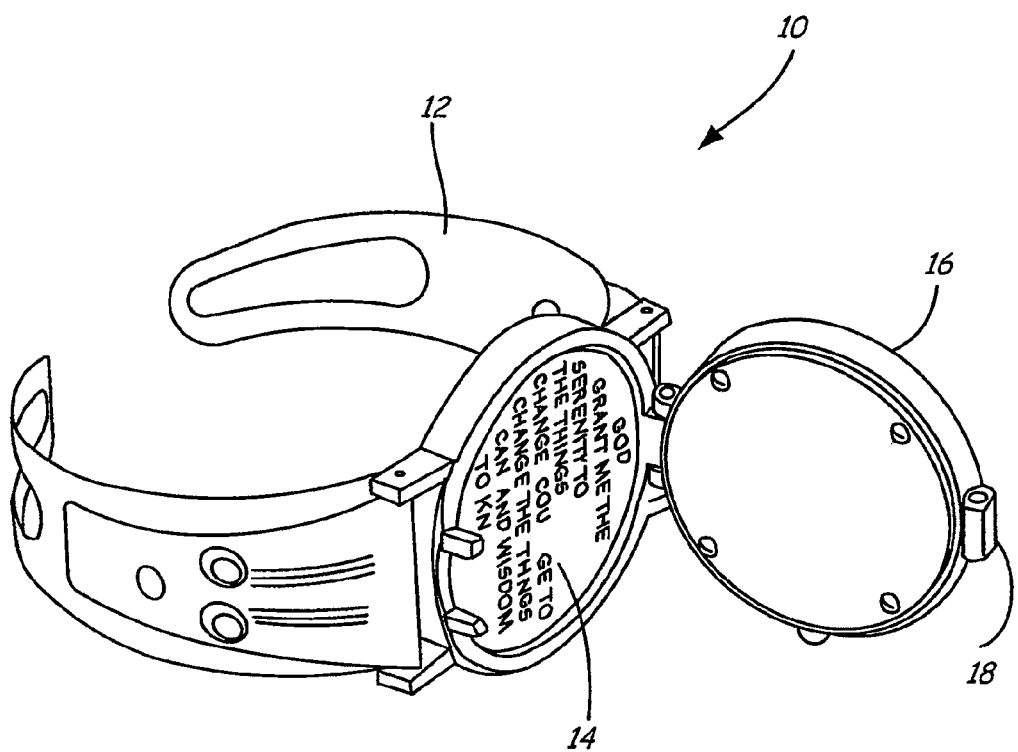
FIG. 1 is a perspective view of an embodiment of the present invention wherein the cover, comprising a watch, is open.

As shown in FIG. 1, a display device 10 in accordance with the present invention generally includes a wristband 12 and an annular body 14 attached to and/or carried by the wristband 12. Another embodiment of the changeable ornament wristband of the present invention further includes a cover 16.

The wristband 12 of the present invention is that of the style typically used in conjunction with wristwatches. The wristband 12 illustrated in the FIGS. is exemplary. In accordance with the present invention, the wristband 12 may be made of a variety of materials including, but not limited to, leather, gold, silver, stainless steel and copper. In a further embodiment of the display device of the present invention, the wristband 12 may be made of a magnetic material typically used in magnetic therapy bracelets.

Figure 2:
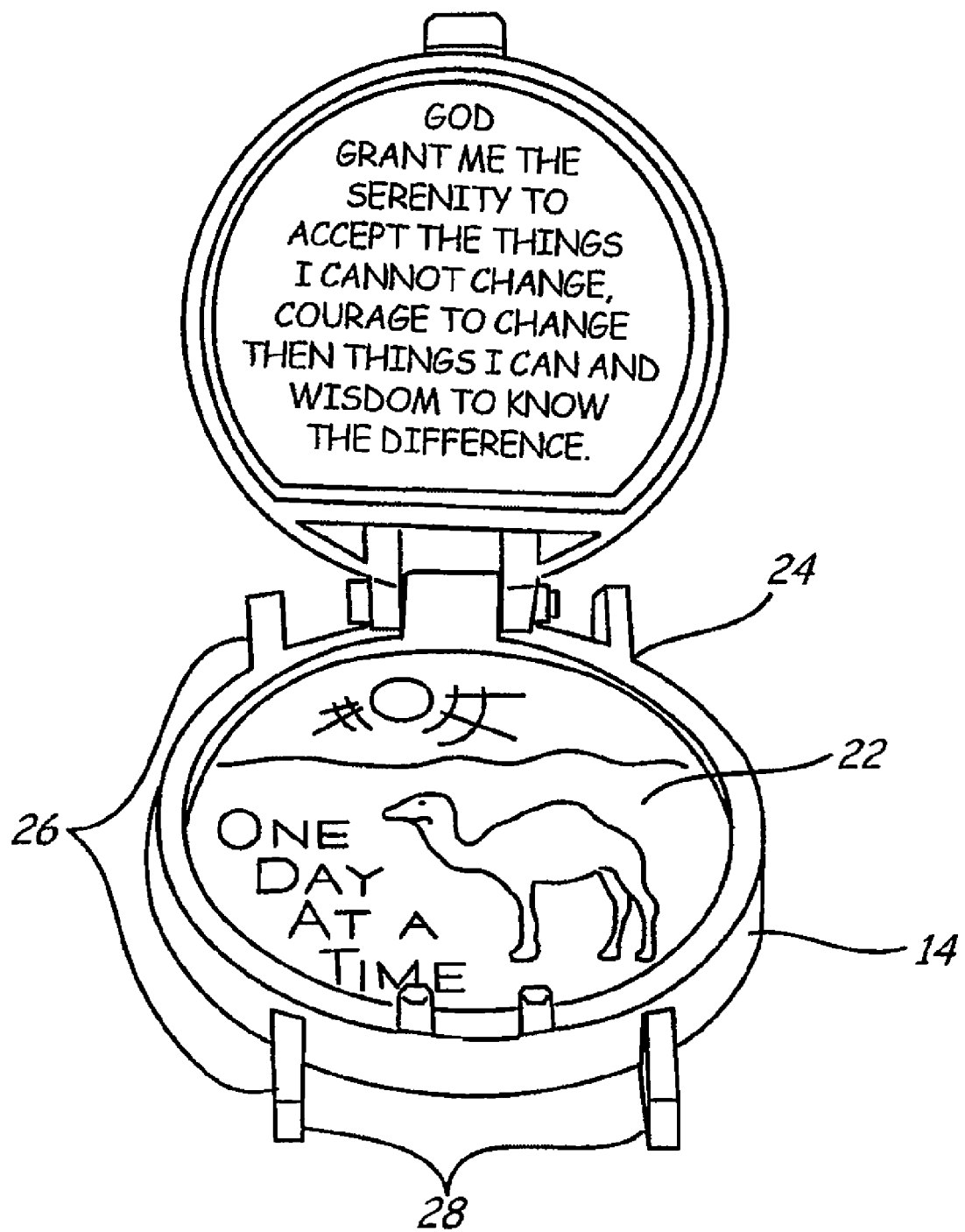
FIG. 2 is a perspective view of an annular body and open cover with a coin-like medallion displayed in both the annular body and the inside of the cover.

Referring now to FIG. 2, the annular body 14 supports a display item 22 that a user has chosen or selected to be displayed. The annular body 14 may be manufactured in various sizes and shapes in relation to the size and shape of the display item 22 desired. FIG. 2, for example, shows one display item 22 of circular shape and another of circular shape with a flat bottom. The display items 22 illustrated in the FIGS. are exemplary and do not limit the invention in any way. In one preferred embodiment of the present invention, the display item is a generally coin-like commemorative medallion.

Figure 3:
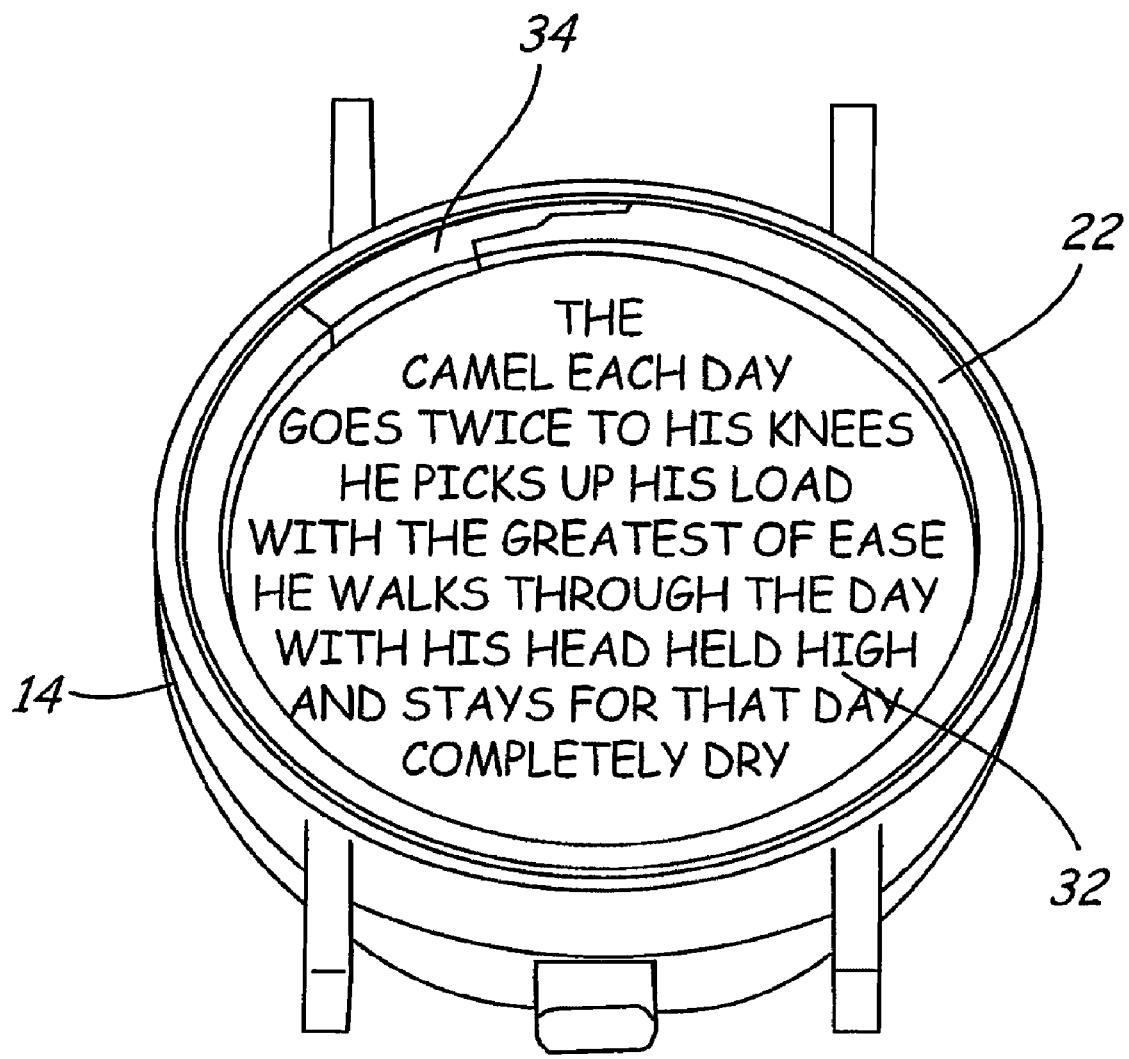
FIG. 3 is a perspective view of a snap ring on the underside of the annular body.

As shown in FIGS. 2 and 3, the annular body 14 comprises a shoulder 24, a groove 34 and a snap ring 32. The shoulder 24 extends inward from the inside surface of the annular body 14, thereby creating a shoulder 24 that has a smaller circumference than the outermost circumference of the display item 22, and creating a shoulder surface 25, illustrated in FIG. 4. The shoulder 24 keeps the display item 22 from falling through the upper circumferential surface of the annular body 14.

The display item 22 is firmly secured against the shoulder surface 25 by use of a snap ring 32. Viewing the annular body 14 from the lower circumferential surface, as shown in FIG. 3, the snap ring 32 is adapted to securely fit into the groove 34. The groove 34 is an indentation in the inside surface of the annular body 14 placed a distance approximately the width of the display item 22 away from shoulder surface 25 in a direction towards the lower circumferential surface of the annular body 14. The snap ring 32 has a spring-like quality. When the snap ring 32 is in a stable state, the outermost circumference of the snap ring 32 is larger than that of the inside surface of the annular body 14. The snap ring 32 is adapted to be temporarily tensed or deflected in such a way that the outermost circumference of the snap ring 32, or portions thereof, is temporarily smaller than the internal circumference of the annular body 14. The snap ring 32 can then be generally aligned with the groove 34, so that when released, it will return to its larger circumference and snuggly fit into the groove 34.

Referring to FIG. 4, in a preferred embodiment of the present invention, the snap ring 32 contains holes 42 at both ends. A suitable tool may be used in conjunction with the holes 42 to remove the snap ring from the groove 34, thereby allowing a user to remove and change the display item 22.

In an additional embodiment, a cushioning ring 44 having an external circumference 45 generally corresponding to the internal circumference of the annular body 14 and an internal circumference 46 generally corresponding to the circumference of the shoulder 24 can be placed between the shoulder surface 25 and the surface of the display item 22. Alternatively, the internal circumference 46 of the cushioning ring can be larger or smaller than the circumference of the shoulder 24. The cushioning ring 44 can be removable. Alternatively, the cushioning ring 44 can be permanently attached to the shoulder surface 25. The cushioning ring 44 can be manufactured from a synthetic rubber, fabric, or any other suitable material known in the art for dampening movement or softening or cushioning the contact between two objects. In one embodiment, the cushioning ring 44 is a gasket of the type manufactured by Borel (of Kansas City) or other suitable gasket like structure. In the present invention, the cushioning ring 44 can be used to firmly support and cushion the display item 22 while minimizing movement of the display item 22 between the shoulder 24 and the snap ring 32.

Figure 15:
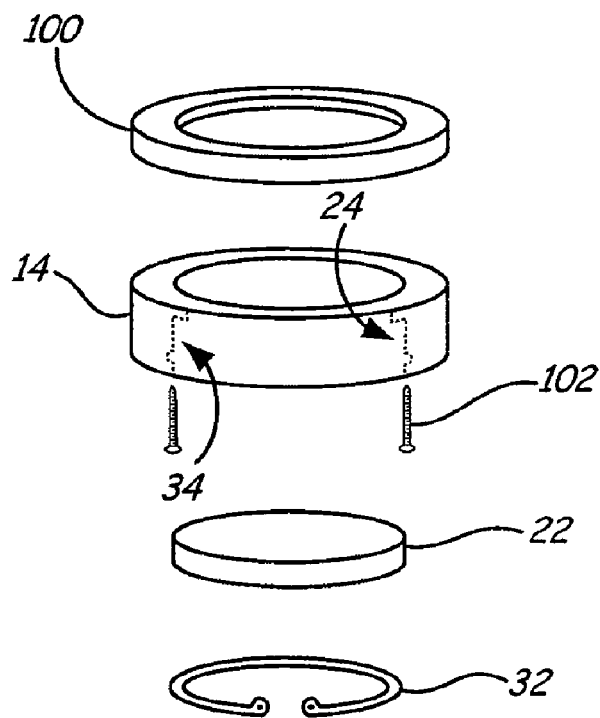
FIG. 15 is an expanded perspective view of an upper removable bezel and corresponding annular body.

In an alternative embodiment, illustrated in a broken-apart perspective view in FIG. 15, the annular body 14 can include a removable bezel 100 or rim attached to the uppermost circumferential surface of the annular body 14. The bezel 100 is adapted to snap-fit onto the annular body 14. The bezel is adapted to be quickly and easily removable. Alternatively, the bezel 100 can be secured to the annular body 14 by any other means of attachment known in the art. For example, the bezel 100 may have an annular surface. In such an embodiment, the annular surface of the bezel 100 and the annular body 14 may include complimentary threads, wherein the bezel 100 screws into the annular body 14. Alternatively, the annular body 14 may screw into the bezel 100. The complimentary threads may involve two or three turns or windings around both the annular body 14 and the annular surface of the bezel 100. Alternatively, any number of turns or windings may be selected. Similarly, where a more permanent bezel is desired, the bezel 100 can be secured to the annular body 14 with machine screws 102 which enter the underside of the annular body 14, pass through the annular body 14, and enter into the underside of the bezel 100. Such means of attachment may be desired where the user possesses only one display item 22 that she wishes to place in the annular body 14. The bezel 100 may be decorative in nature and may be interchangeable.

Figure 16:
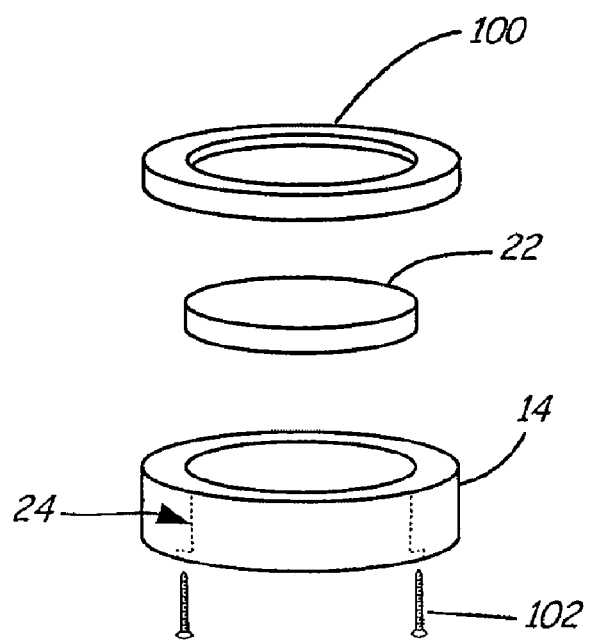
FIG. 16 is an alternate expanded perspective view of an upper removable bezel and corresponding annular body.

FIG. 16 illustrates an embodiment of the present invention having a removable bezel 100, wherein the display item 22 may be positioned on the upper surface of the shoulder 24, and the bezel 100 can then be secured over the display item 22 in the same manner previously described. The bezel 100, as used in this manner, has an inner circumference that is smaller than the overall circumference of the display item 22. The display item 22 is thereby supported firmly between the shoulder 24 and the bezel 100. A cushioning ring 44, as described previously, can further be positioned between the shoulder 24 and the display item 22. In a similar manner, a cushioning ring 44 can be positioned between the bezel 100 and the display item 22.

Figure 17:
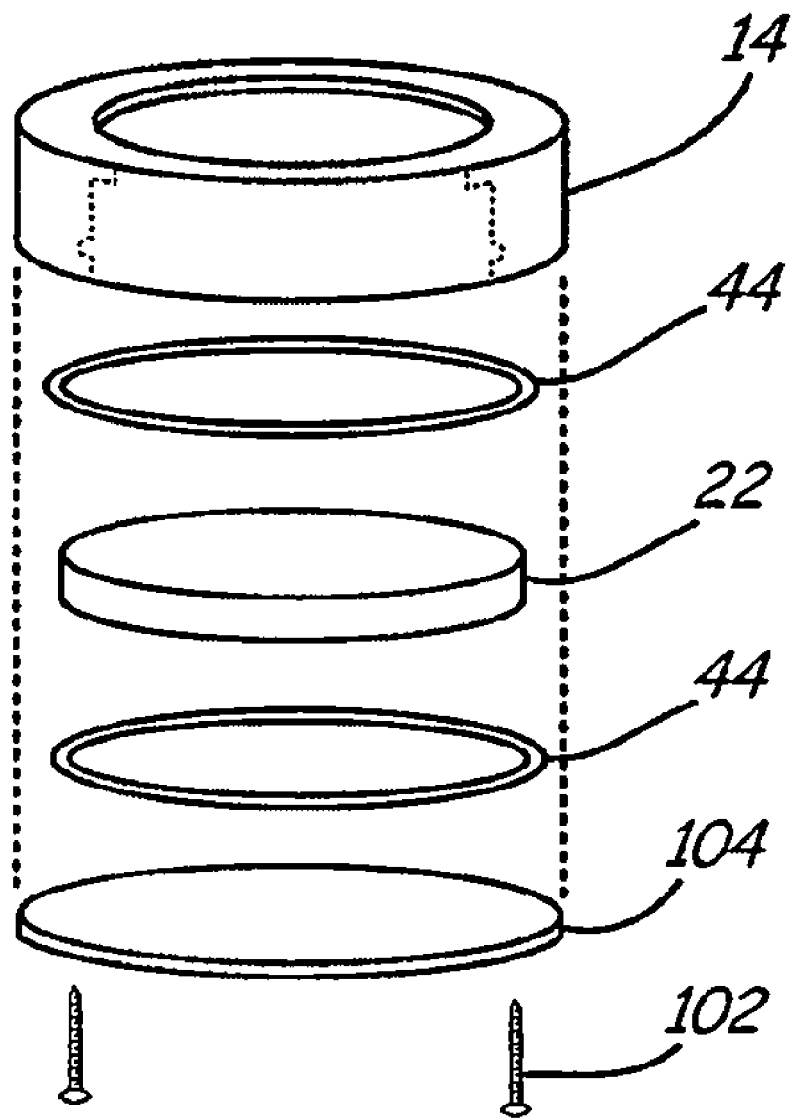
FIG. 17 is an expanded perspective view of a lower removable cap and corresponding annular body.
Figure 18:
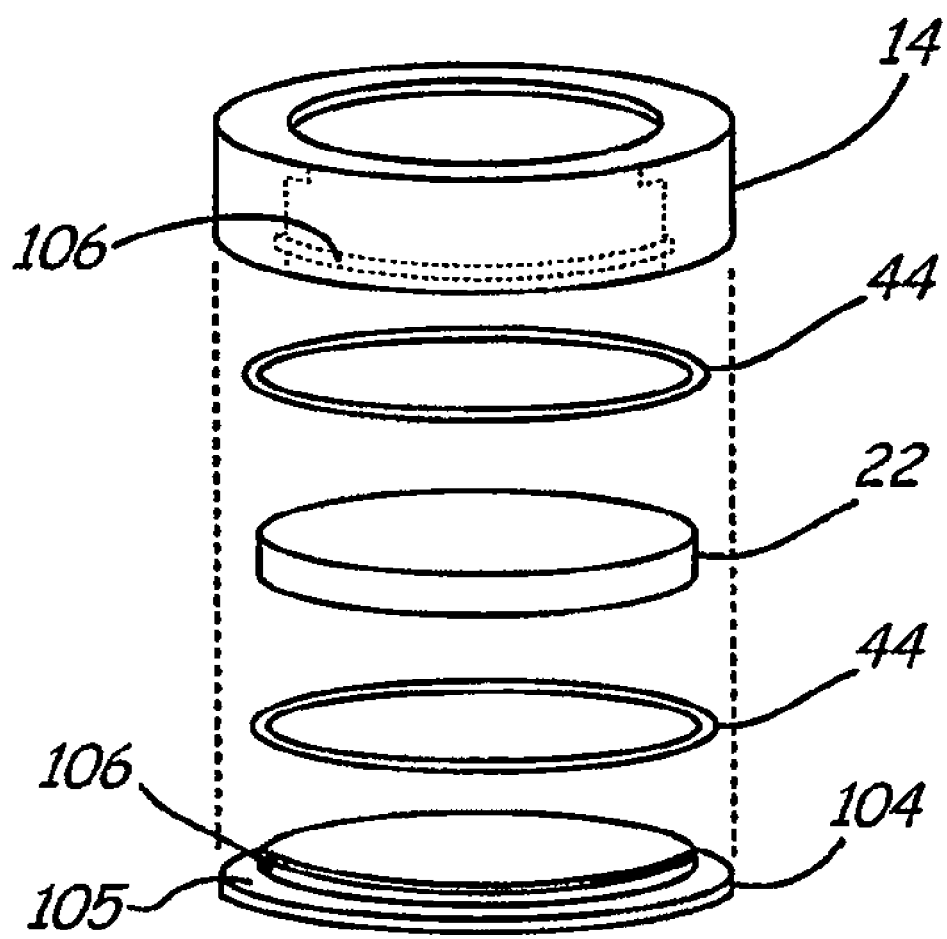
FIG. 18 is an expanded perspective view of a lower removable cap and corresponding annular body, wherein the cap and the annular body have complimentary threads.

In a further embodiment, shown in FIG. 17, a bezel or cap 104 may similarly be included on the lower circumferential surface of the annular body 14, i.e., on the bottom. The bezel or cap 104 may be made of entirely opaque material. Alternatively the bezel or cap 104 may be entirely, or contain portions that are, transparent or translucent. In such an embodiment, the bezel or cap 104 is adapted to snap-fit onto the annular body 14. The bezel or cap 104 is adapted to be quickly and easily removable. Alternatively, the bezel or cap 104 can be secured to the annular body 14 by any other means of attachment known in the art. For example, as illustrated in FIG. 18, the bezel or cap 104 may have an annular surface 105. In such an embodiment, the annular surface 105 of the bezel or cap 104 and the annular body 14 may include complimentary, cooperating threads 106, wherein the bezel or cap 104 screws into the annular body 14. Alternatively, the annular body 14 may screw into the bezel or cap 104. The complimentary threads 106 may involve two or three turns or windings around both the annular body 14 and the annular surface 105 of the bezel or cap 104. Alternatively, any number of turns or windings may be selected. Similarly, where a more permanent bezel is desired, the bezel or cap 104 can be secured to the annular body 14 with machine screws 102 which pass through the bezel or cap 104 and enter into the underside of the annular body 14. The bezel or cap 104 may be decorative in nature and may be interchangeable.

In an embodiment of the present invention having a removable bezel or cap 104 on the underside of the annular body 14, the display item 22 may be positioned against the lower surface of the shoulder 24 and the bezel or cap 104 can then be secured underneath the display item 22 in a similar manner as that previously described. In an embodiment having a bezel rather than a cap, the bezel, as used in this manner, has an inner circumference that is smaller than the overall circumference of the display item 22. The display item 22 is thereby supported firmly between the shoulder 24 and the bezel or cap 104. A cushioning ring 44, as described previously, can further be positioned between the shoulder 24 and the display item 22. Similarly, a cushioning ring 44 can be positioned between the bezel or cap 104 and the display item 22.

In one embodiment, the display device of the present invention takes the form of a changeable ornament wristband 10 including connector posts 26 on the outside surface of the annular body 14 for securing the annular body 14 to a wristband 12. The connector posts 26 contain spring pin holes 28 adapted to receive the protruding ends 54 of a spring pin 52, shown in FIG. 5. The spring pin 52 may be used in conjunction with the wristband 12 in the typical fashion of mounting or connecting wristwatches to watchbands or the like. The spring pin 52 is inserted into one of the ends of the wristband 12. The protruding ends 54 may be pressed into the barrel 56 of the spring pin 52, and the spring pin 52 is placed in such a position that when the protruding ends 54 are released, they extend into the spring pin holes 28 of the connector posts 26, thereby securing the wristband 12 to the annular body 14.

Figure 6:
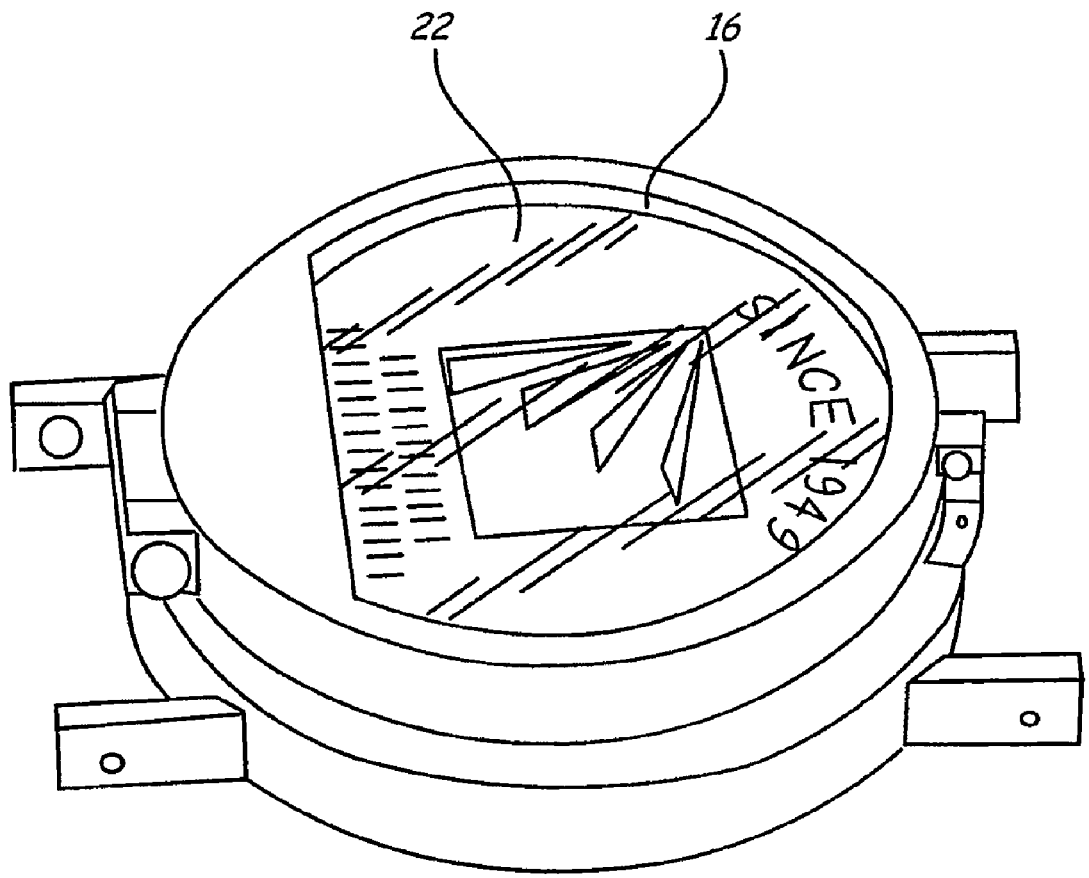
FIG. 6 is a perspective view of an annular body and closed cover wherein a coin-like item is displayed on the outer-side of the cover.
Figure 10:
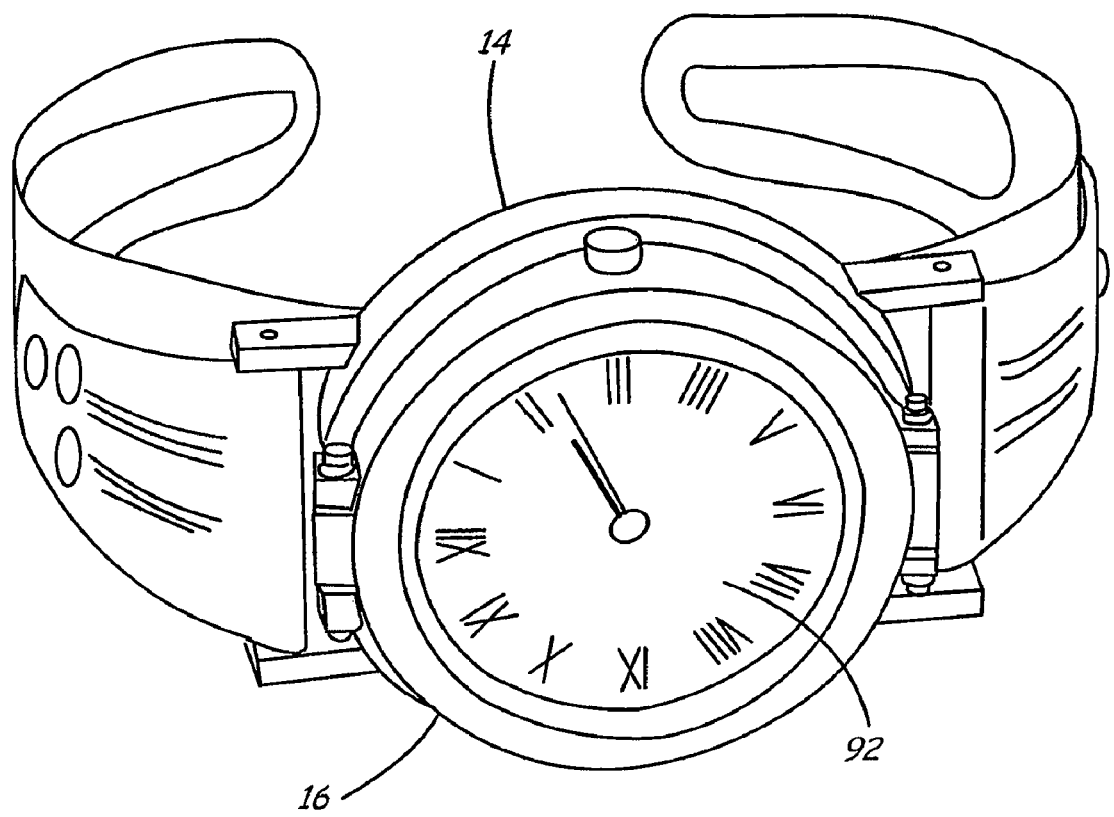
FIG. 10 is a front perspective view of an embodiment of the present invention wherein a clock or timepiece is substituted for a display item in the cover.
Figure 11:
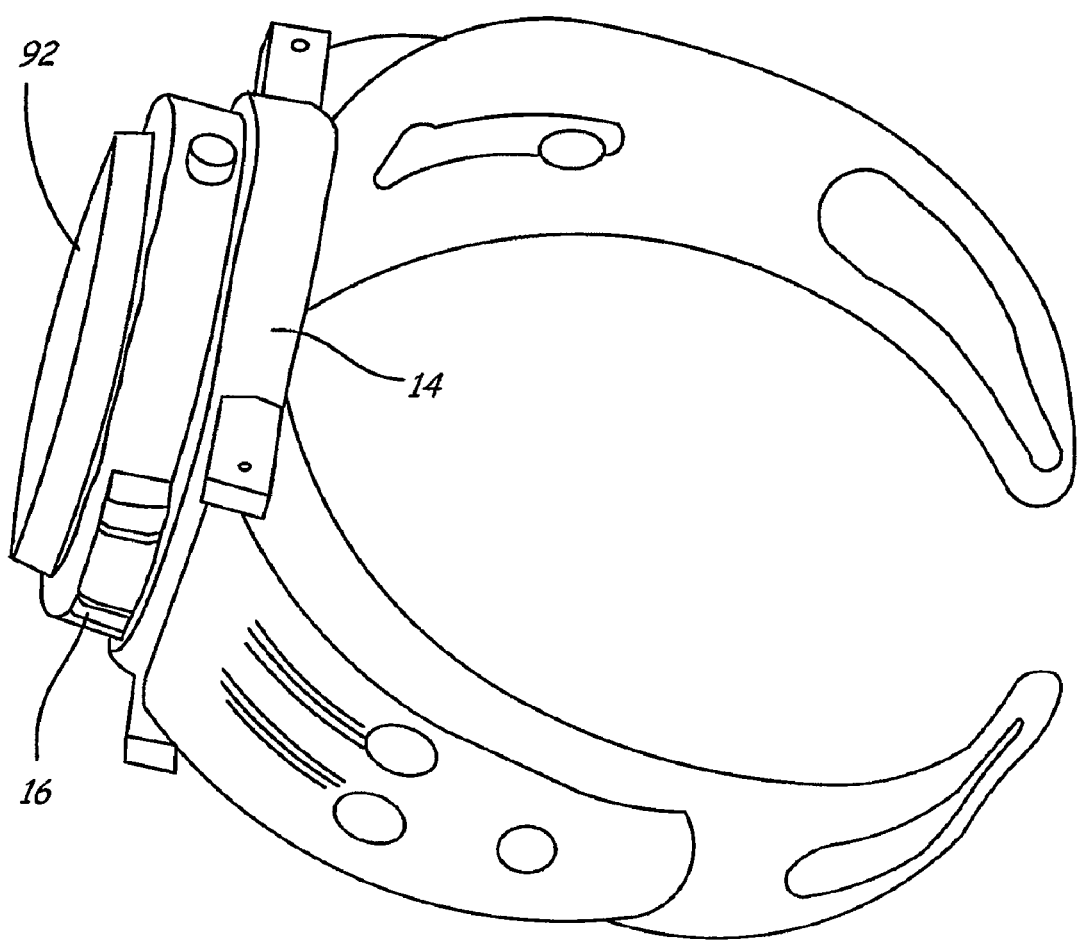
FIG. 11 is a side perspective view of an embodiment of the present invention wherein a timepiece is substituted for a display item in the cover.
Figure 12:
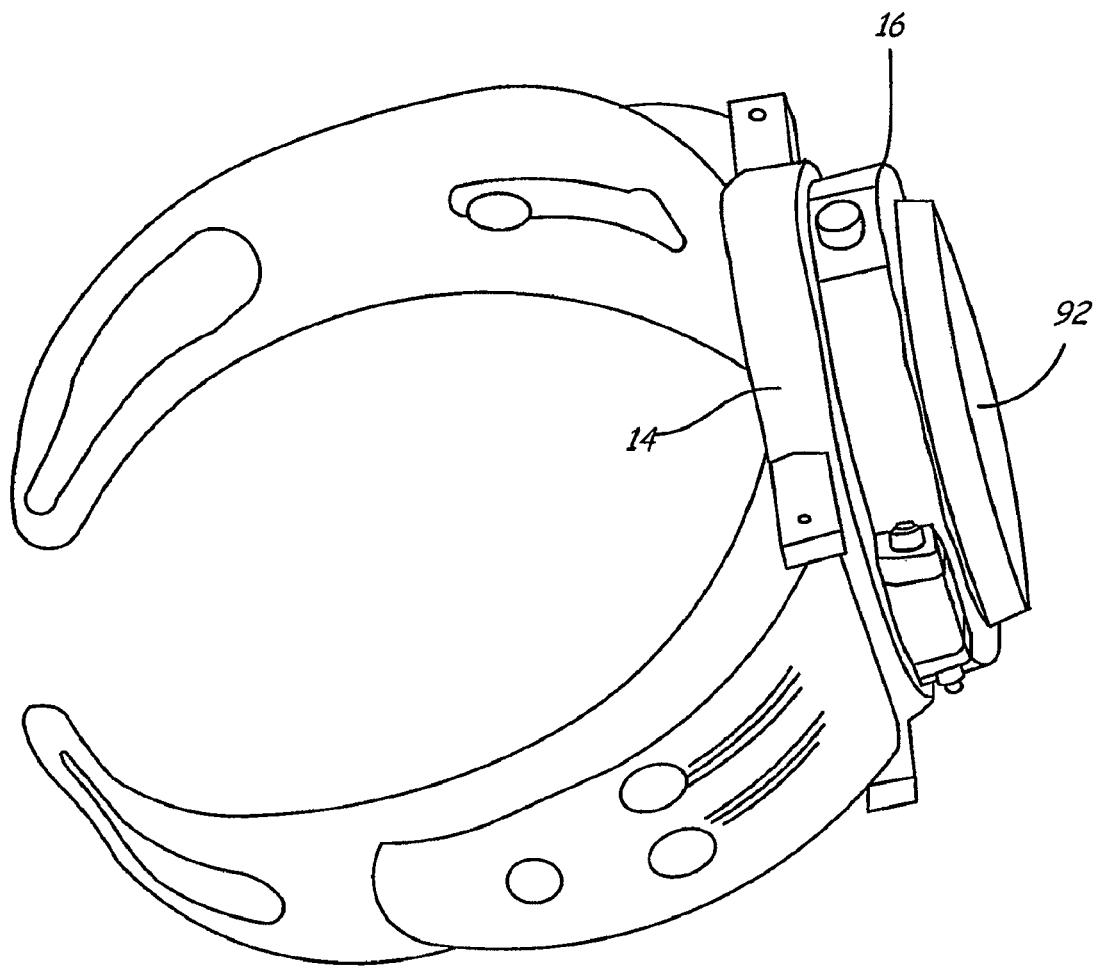
FIG. 12 is another side perspective view of an embodiment of the present invention wherein a timepiece is substituted for a display item in the cover.
Figure 13:
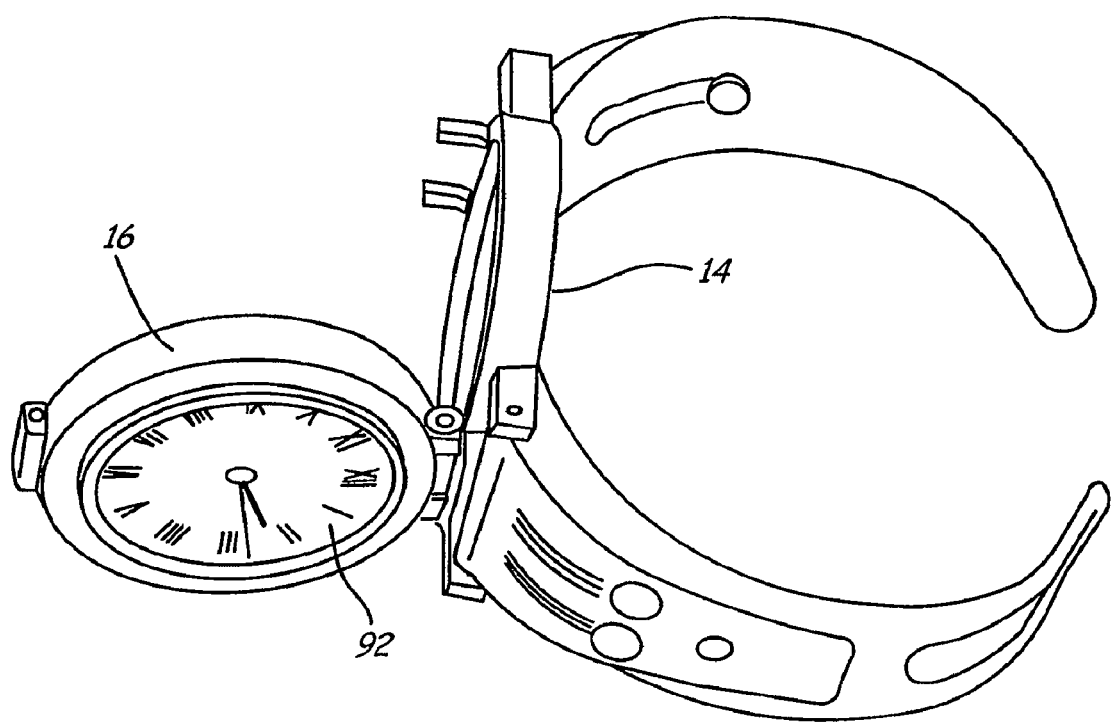
FIG. 13 is a side perspective view of an embodiment of the present invention wherein a timepiece is substituted for a display item in the cover, the cover being in an open position.

An alternative embodiment of the display device 10 of the present invention further comprises a cover 16 as shown in FIG. 6. The cover 16 may display additional display items 22 or, alternatively, may comprise a timepiece face 92, as shown in FIG. 10.

Figure 7:
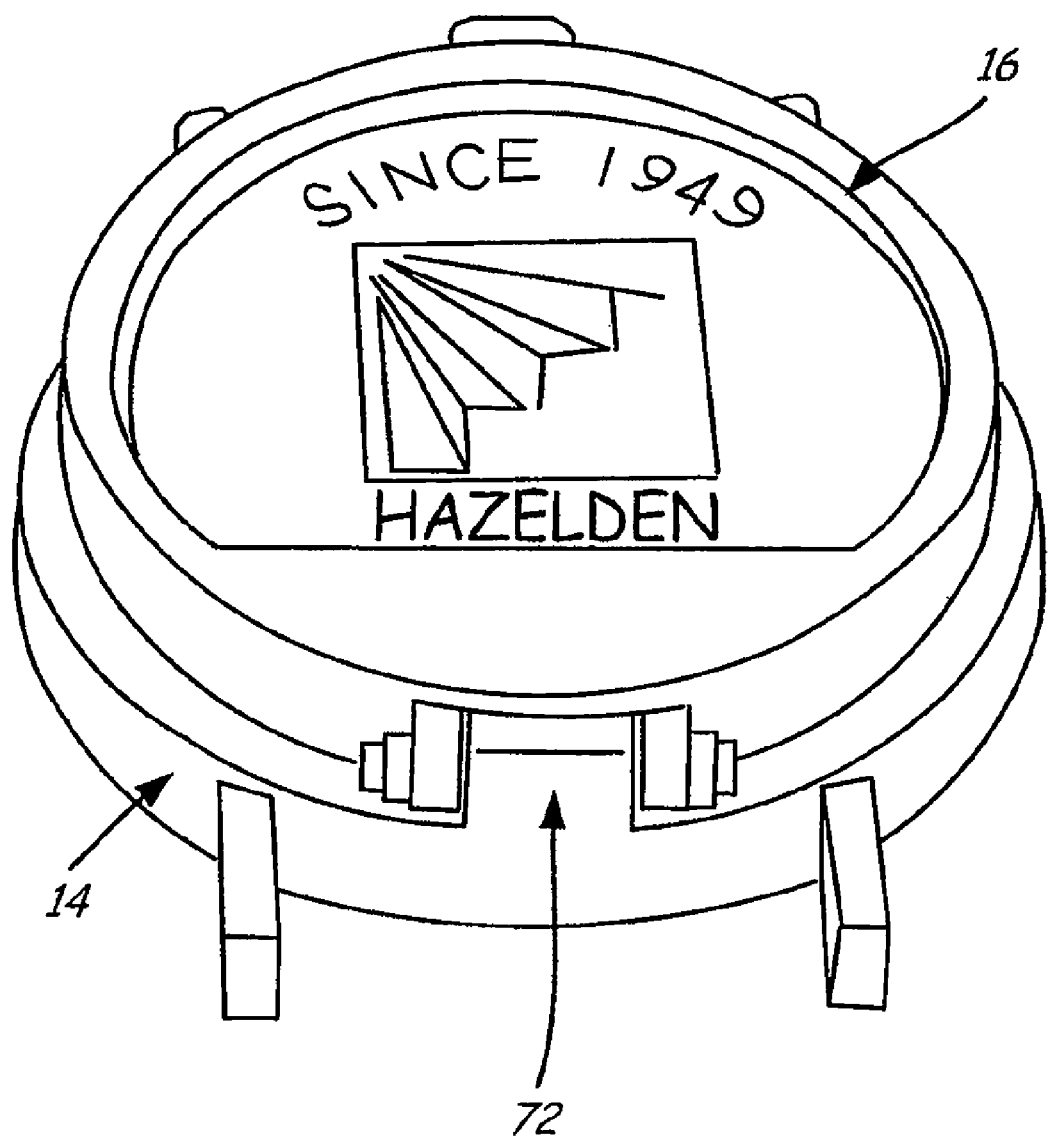
FIG. 7 is a perspective view of one embodiment of the hinge attaching the cover to the annular body.
Figure 9:
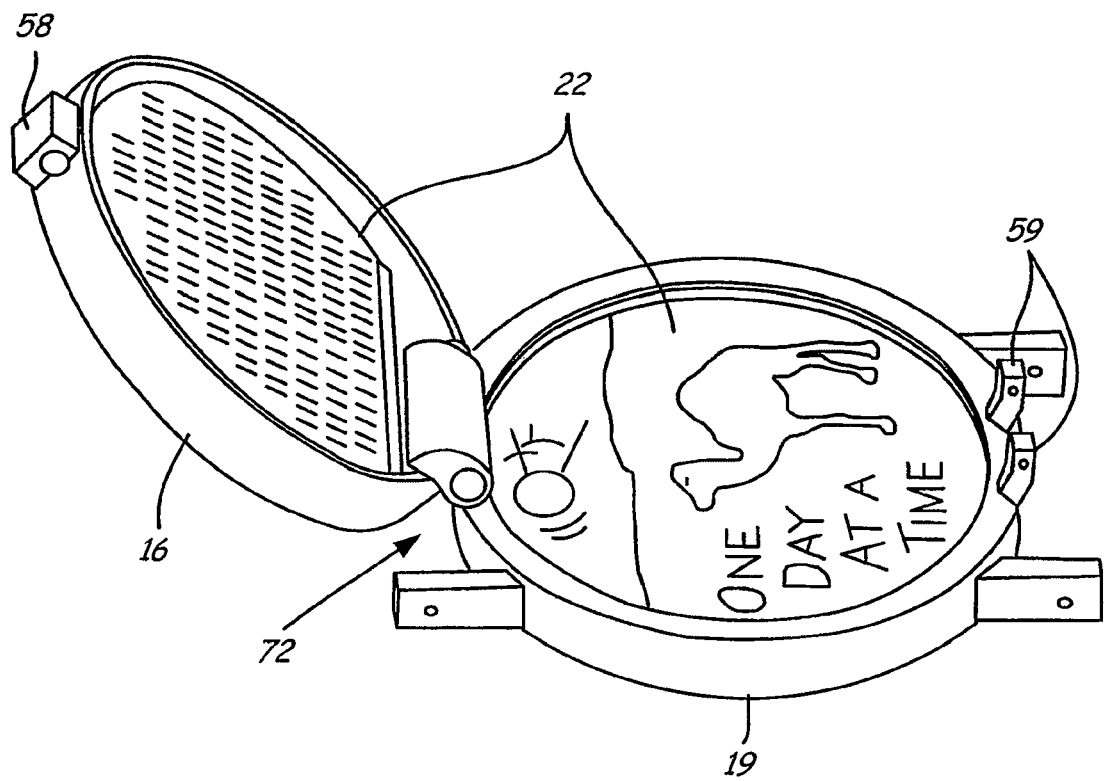
FIG. 9 is a side perspective view of an annular body and open cover wherein a coin-like item is displayed in both the annular body and the inner-side of the cover.

Referring to FIGS. 7 and 9, the cover 16 is attached to the annular body 14 by a hinge 72. The cover 16, therefore, has the ability to be opened and closed. FIG. 7 shows the cover 16 in a closed position over the annular body 14, while FIG. 2 shows the cover 16 in an open position allowing annular body 14 to be visible. Hinge 72, illustrated in FIG. 7, is exemplary. Other suitable structures and/or methods may be used to operably connect the cover 16 and the annular body 14. For example, the cover 16 may be entirely separable from the annular body 14, and be snap-fit onto the annular body 14. In an alternative embodiment, the hinge 72 may be hidden from view as shown in FIG. 4.

Figure 5A:
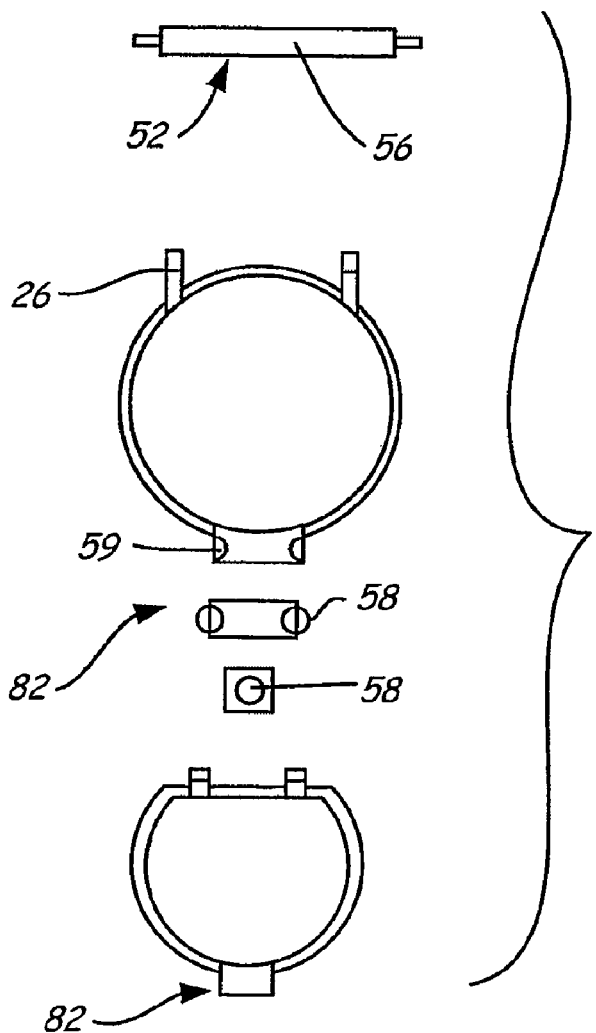
FIGS. 5A-5B, depicts a diagram of the connector posts, the latching mechanism and the snap ring of the present invention.
Figure 5B:
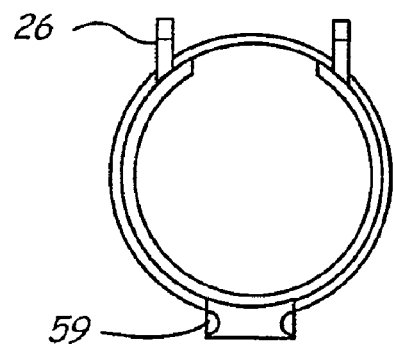
Figure 8:
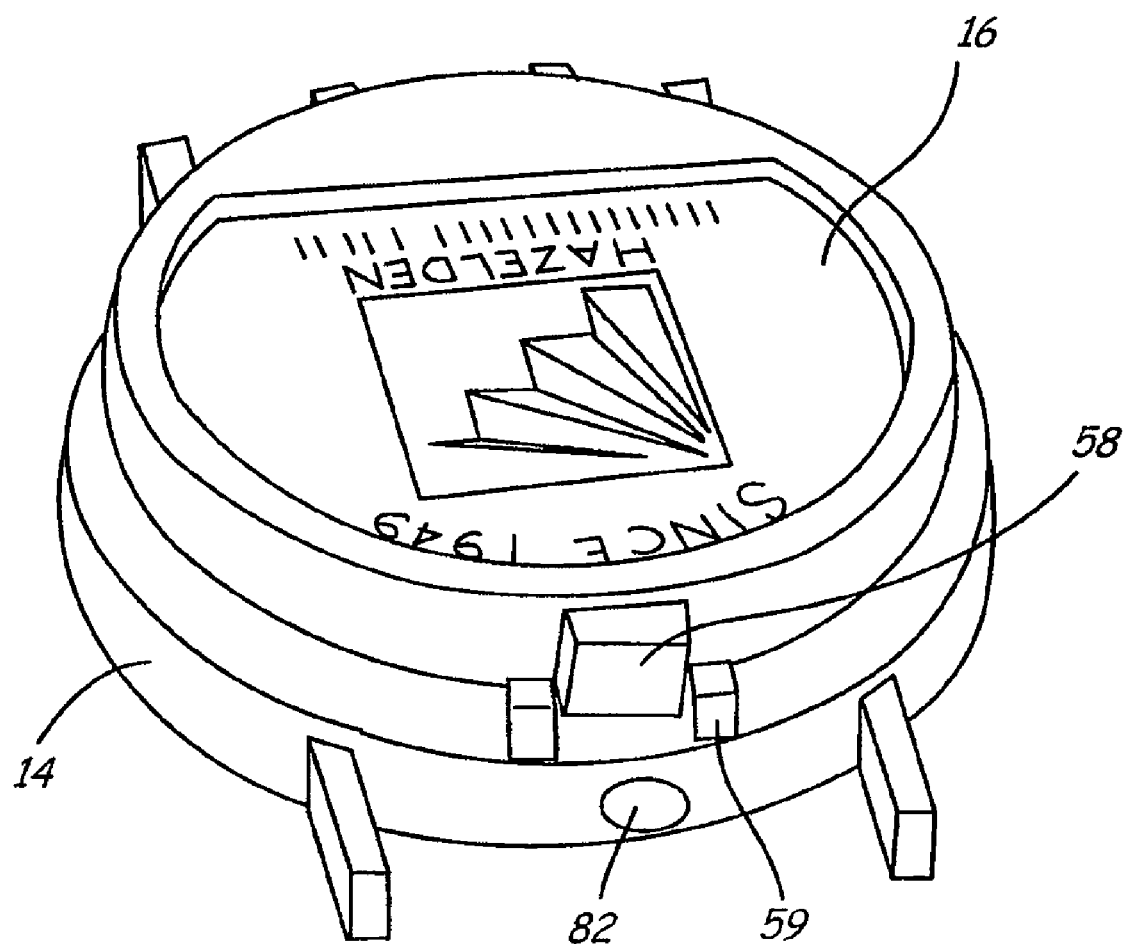
FIG. 8 is a perspective view of one embodiment of the latching mechanism.

An alternative embodiment of the present invention including a cover 16 may further comprise a latching mechanism 82 shown in FIG. 8. The latching mechanism 82 is partially attached to the cover 16 and partially attached to the annular body 14, thereby, when engaged, securely holding the cover 16 substantially parallel to the annular body 14 in a closed position. The latching mechanism 82 of one preferred embodiment, as shown in FIG. 5, contains a male component 58 containing moveable ball bearings and a female component 59 adapted to receive the ball bearings. Typically, one component, i.e., the male component 58, would be carried by the cover 16 while the other complimentary component, i.e., the female component 59, would be carried by the annular body 14.

The cover 16 may carry, hold or display another display item 22 more or less similar to the display item 22 described above, in a more or less similar manner as described for the annular body 14. Alternatively, the cover may hold two or more additional display items 22. For example, one display item 22 may be visible on the outside or exterior of the cover 16, as shown in FIG. 6, while a separate display item 22 may be visible on the inside of the cover 16, as shown in FIG. 2. Each additional display item 22 is held in place in the cover 16 by a snap ring 32 in conjunction with a shoulder 24 and groove 34 as previously discussed for the display item 22 displayed in the annular body 14. Alternatively, a bezel or cap 104 may be used to secure each additional display item 22 in the cover 16 in the manner previously discussed for securing the display item 22 in the annular body 14. In such embodiments, the bezel or cap 104 may be snap-fit. In other such embodiments, the bezel or cap 104 and the cover 16 may include complimentary threads 106, wherein the bezel or cap 104 screws into the cover 16, or wherein the cover 16 screws into the bezel or cap 104. Alternatively, the bezel or cap 104 can be secured to the cover 16 by any other suitable means of attachment known in the art.

Referring now to FIGS. 10, 11, 12 and 13, in a further embodiment of the cover 16, a clock or watch face 92 may be substituted for one of the additional display items 22. The clock face 92 may be placed on the outside of the cover 16 and visible when the cover is in a closed position, as shown in the FIGS. Alternatively, the clock face 92 may be placed on the inside of the cover 16 and visible only when the cover 16 is in an open position. The timepiece or clock face 92 illustrated in the FIGS. is exemplary.

As illustrated in the FIGS., in one embodiment of the display device and method of the present invention, the display item 22 is a commemorative medallion or coin. In an alternative embodiment, the display item 22 may be a commemorative medallion clock face 23, as shown in FIG. 14. The display items 22 illustrated in the FIGS. are exemplary.

Although the present invention has been described with reference to multiple embodiments, including preferred embodiments, persons skilled in the art will recognize that changes may be made in form and detail without departing from the spirit and scope of the invention. For example, the present invention may be adapted to be a stand-alone display or mount without an attached wristband. With such a device, a user may display the item at any desired location, such as a desktop, counter surface, etc. Alternatively, the device may be adapted for use with necklaces, bracelets, key chains and other similar articles by altering or eliminating the connector posts in such a manner to comply with the intended use. For example, one or both of the connector posts may be replaced with a suitable bail.

I claim:

1. A display device comprising:
    a wristband;
    an annular body having an upper generally circumferential surface, a lower generally circumferential surface, an inside surface and an outside surface;
    a shoulder on the inside surface, the shoulder comprising a shoulder surface generally parallel to one of the upper and lower generally circumferential surfaces;
    a groove adjacent the shoulder;
    a snap ring;
    a display item having a display face, a rear surface and a peripheral edge, wherein the display item is removably connected to the annular body, a portion of the display face contacting the shoulder surface and the peripheral edge generally adjacent to the inside surface, the snap ring being removably received in the groove and in contact with a portion of the rear surface to releaseably capture the display item generally between the shoulder and the snap ring; and
    connector posts carried on the outside surface of the annular body, each of the posts having a relieved area adapted to receive an end of a pin-like body for connecting the annular body to the wristband.

2. The display device according to claim 1, wherein a ring-like body, manufactured of a generally compressible material and having an outer circumference generally corresponding to the internal circumference of the annular body and an inner circumference generally corresponding to the circumference of the shoulder, is positioned generally between the shoulder surface and the surface of the display item, thereby creating a cushion between the shoulder and the display item.

3. The display device according to claim 1, wherein the display item is a coin-like medallion.

4. The display device according to claim 1, further comprising a cover hingedly attached to the annular body, closeable over the annular body.

5. The display device of claim 4, further comprising a latching mechanism, partially attached to the cover and partially attached to the annular body, for securing the cover substantially parallel the annular body.

6. The display device of claim 5, wherein the latching mechanism comprises a male component having at least one moveable ball bearing and a female component adapted to receive the at least one ball bearing, thereby securing the male component to the female component.

* * * * *